April 28, 1970    V. M. CHAPTAL DE CHANTELOUP    3,509,498
DEVICE FOR CHANGING THE SELF-INDUCTANCE
OF AN ELECTRIC CIRCUIT
Filed Jan. 18, 1965    9 Sheets-Sheet 1

Inventor:
Victor M. Chaptal de Chanteloup
BY Baldwin & Wight
Attorneys

Inventor:
Victor M. Chaptal de Chanteloup
BY Baldwin & Wright
Attorneys

April 28, 1970    V. M. CHAPTAL DE CHANTELOUP    3,509,498
DEVICE FOR CHANGING THE SELF-INDUCTANCE
OF AN ELECTRIC CIRCUIT
Filed Jan. 18, 1965                               9 Sheets-Sheet 7

Inventor:
Victor M. Chaptal de Chanteloup
BY Baldwin & Wight
Attorneys

United States Patent Office 3,509,498
Patented Apr. 28, 1970

3,509,498
DEVICE FOR CHANGING THE SELF-INDUCTANCE OF AN ELECTRIC CIRCUIT
Victor M. Chaptal de Chanteloup, Paris, France, assignor to Société Industrielle Bull-General Electric (Société Anonyme), Paris, France
Filed Jan. 18, 1965, Ser. No. 426,092
Claims priority, application France, Feb. 6, 1964, 962,807
The portion of the term of the patent subsequent to Jan. 30, 1985, has been disclaimed
Int. Cl. H03h 7/30; H01t 21/08
U.S. Cl. 333—31                                 6 Claims

ABSTRACT OF THE DISCLOSURE

The invention provides devices useful as gates and delay lines which make use of certain properties exhibited by a thin magnetic film possessing uniaxial magnetic anisotropy and conducting electricity. When such a film is placed in a magnetic field, its magnetic permeability along the direction of difficult magnetization takes one or the other of two largely different values according to whether or not said magnetic field exceeds a given value. Use of this property together with the conducting property of such a thin magnetic field makes it possible to control the self-inductance of an electric circuit magnetically coupled to this film by passing a control electric current through the latter.

---

The present invention relates to variable-impedance devices utilising certain properties of thin films of electrically conductive ferromagnetic material.

When a ferromagnetic material disposed in the form of a thin film and having an axis of easy magnetisation situated in the plane of the film is placed in a magnetic field directed along the axis of difficult magnetisation situated in the plane of the film perpendicularly to the axis of easy megnetisation, its residual induction along this axis of difficult magnetisation is negligible and its magnetic permeability along this axis is constant until saturation, which occurs substantially without transition for a value of the field equal to the field of anisotropy of the material thus disposed.

Under the above-specified conditions, the hysteresis curve of the ferromagnetic material is thus reduced to a straight line extending through the origin and joining without transition the half-straight lines representng the saturated state of the material.

The value of the magnetic permeability possessed under these conditions by certain materials, such as ferronickels, with field values lower than the value of the field of anisotropy may be very high, for example above 10,000, and it changes without transition to the value 1 when the value of the field becomes greater than that of the field of anisotropy.

Therefore, it is possible by means of variations of small amplitude of a magnetic field directed along the axis of difficult magnetisation to obtain considerable variations of the magnetic permeability under consideration.

It is also possible to obtain appreciable variations of the magnetic permeability under consideration by creating in the material a magnetic field directed along the axis of easy magnetisation and by varying this field to a sufficiently high degree.

In accordance with the invention, certain properties of thin films of the aforesaid type may be advantageously utilised to provide a variable-inductance device. Such a device is produced by forming the magnetic core of an electric circuit whose self-inductance it is desired to vary, by means of a thin film of the type under consideration, which is so disposed as to be traversed perpendicularly to its axis of easy magnetisation by lines of force of a magnetic field due to a current flowing through the said electric circuit, and by associating with this thin film means for creating in its plane a control magnetic field capable of bringing the ferromagnetic material to the state of magnetic saturation, so as to modify the apparent magnetic permeability of this material perpendicularly to the axis of easy magnetisation and thus to modify the inductance of the electric circuit whose magnetic core is formed by the said film.

The invention therefore concerns a variable-inductance device comprising an electric conductor made of a ferromagnetic material disposed in the form of a thin film and having an axis of easy magnetisation in the plane of the film, connection members being provided to pass an electric current through this conductor, in the plane of the film, an electric circuit such that lines of force of a magnetic field due to a current passing through this circuit flows through this conductor along the axis of difficult magnetisation situated in the plane of the film perpendicularly to the axis of easy magnetisation, and control means connected to the connecting members and permitting of passing through the conductor a control electric current capable of creating in the conductor a magnetic field whose intensity may take either one of two values which are so chosen that a change of this intensity from one of these values to the other brings about a variation of the apparent permeability of the conductor, along the axis of difficult magnetisation and thus produces a corresponding variation of the self-inductance of the electric circuit.

The invention also concerns variable-delay lines constructed with variable-inductance devices of the above-defined type, modified in an appropriate manner.

In accordance with another invention which is described and claimed in U.S. Patent 3,366,939, the aforementioned properties of conductive anisotropic magnetic thin film may be employed to utilise certain electromagnetic induction phenomena which accompany the passage of a variable electric current through a conductor so to realize a device having changeable resistance and internal inductance. In such a device the resistance and the internal inductance of the magnetic film is controlled by a controlling magnetic field applied thereto. The magnetic film is thus used as a controlled element, whereas, in the device according to the present invention, the magnetic film is used as a controlling element.

Various objects, features and advantages of the present invention will become apparent from the following description and from the accompanying drawings, in which:

FIGURE 1 llustrates a first variable-inductance device according to the invention;

Figure 13:
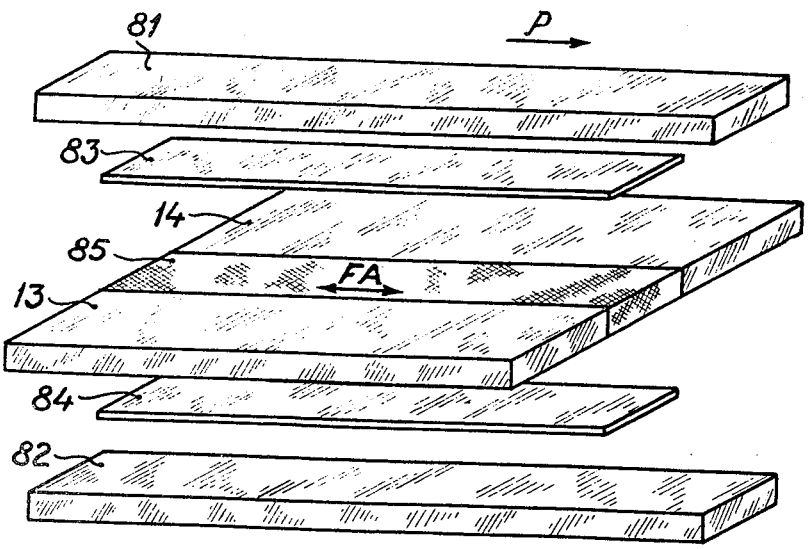
Figure 12:
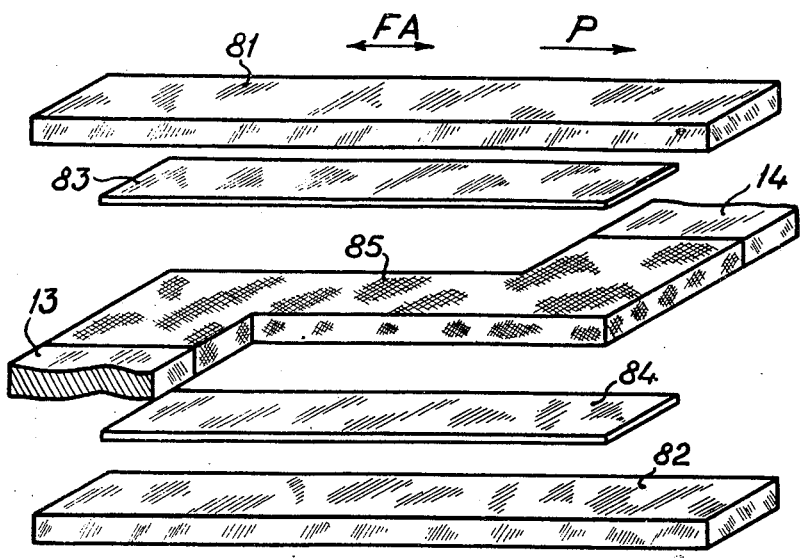
Figure 15:
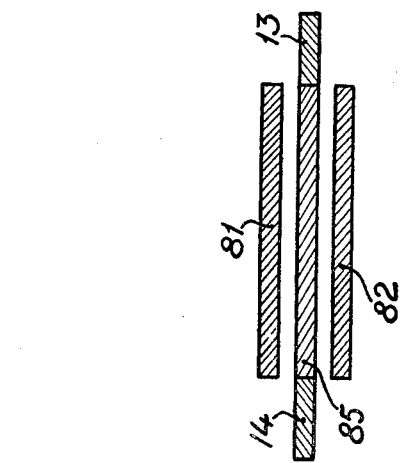
Figure 14:
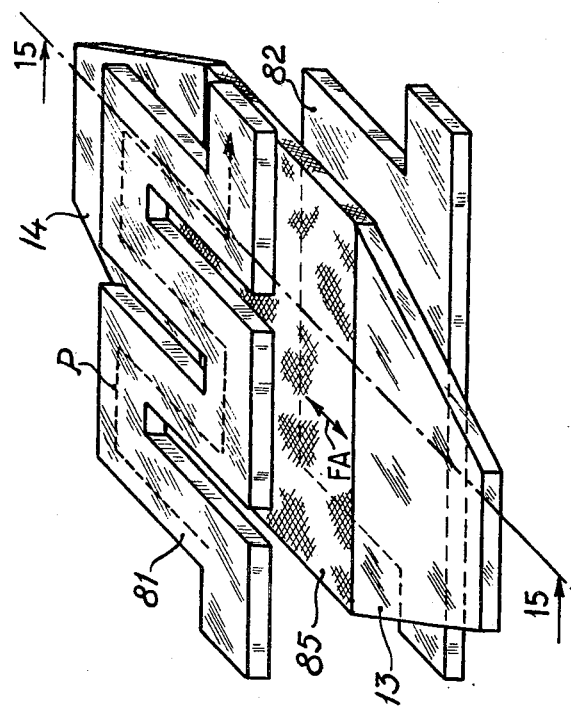

FIGURES 12, 13 and 14, which are exploded perspective views, illustrate three forms of variable-delay lines according to the invention;

FIGURE 15 is a section along the line 15—15 of FIGURE 14, and

Figure 16:
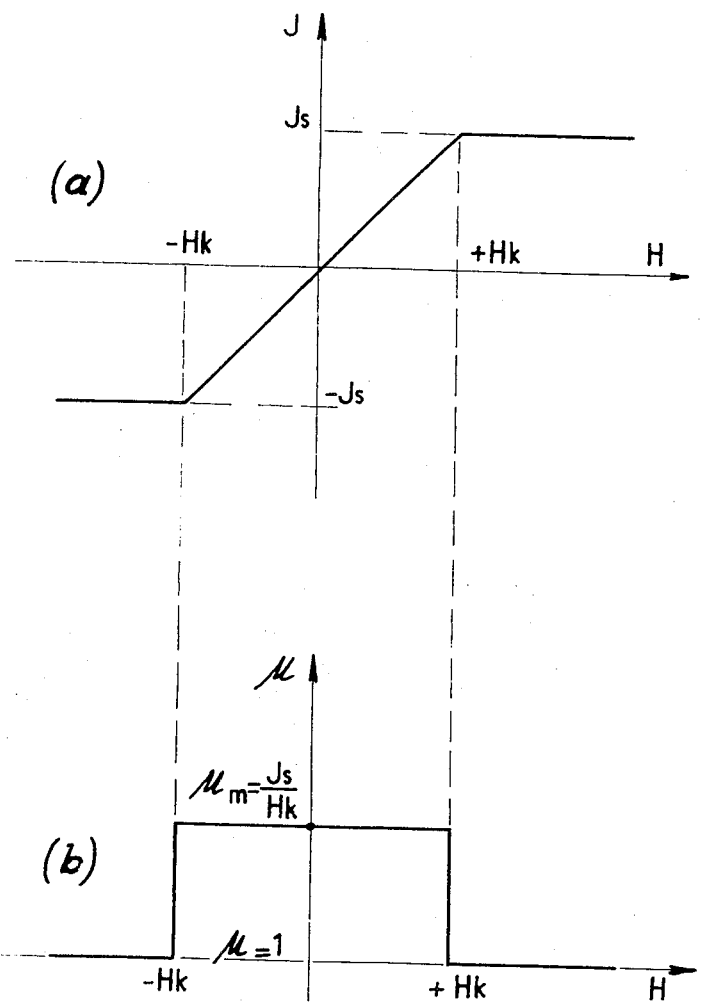

FIGURE 16 shows curves representing certain characteristic properties of a ferromagnetic material which may be employed in the devices according to the invention.

The device illustrated in FIGURE 1 comprises an electric control conductor 10 formed of a thin film of electrically conductive ferromagnetic material, and a circuit element 20 formed of a winding 21 connected by conductors 22 and 23 to an electric circuit 70, whose self-inductance it is desired to vary and which will hereinafter be referred to as the signal-processing circuit.

Figure 1:
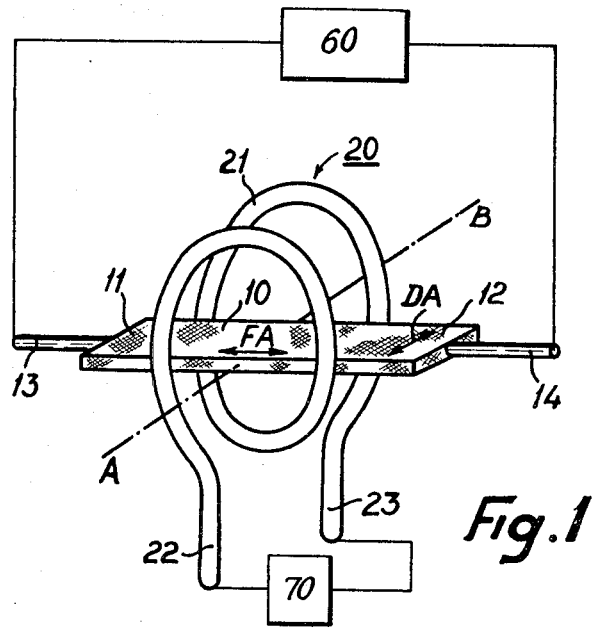

The control conductor 10 has an axis of easy magnetisation which is indicated in FIGURE 1 by the two-pointed arrow FA and an axis of difficult magnetisation perpendicular to the axis of easy magnetisation. The direction of the axis of difficult magnetisation, situated in the plane of the thin film, is indicated in FIGURE 1 by the two-pointed arrow DA. The axis AB of the winding 21 is contained in the plane of the thin film which forms the control conductor 10, and is directed along this axis DA.

Lines of force of a magnetic field due to a current passing through the winding 21 therefore pass through the control conductor 10 along the axis of difficult magnetisation, so that the self-inductance of the electric circuit connected to the winding 21 depends upon the apparent magnetic permeability possessed by the control conductor 10 along this axis of difficult magnetisation.

The curves (a) and (b) of FIGURE 16 indicate respectively the values of the magnetisation J and of the magnetic permeability $\mu$ of the material forming the control conductor 10, as a function of the value of the intensity H of a magnetic field whose lines of force are contained in the plane of the film and are directed along the axis of difficult magnetisation.

Some ferro-nickels, such as the alloy commercially known as "Permalloy" have the characteristics required to form the conductor 10.

Conductors or electrodes 13 and 14 connected at ends 11 and 12 of the control conductor 10 permit of connecting the latter to a control electric circuit 60. The ends 11 and 12 of the control conductor 10 are situated in positions which are deduced from one another by a translation directed along the axis of easy magnetisation FA, in such manner that a control current fed by the control circuit into the control conductor 10 passes through the latter along this axis.

The lines of force of the magnetic field induced by this control current extend in planes perpendicular to the direction of the current, that is to say, in planes perpendicular to the axis of easy magnetisation of the material forming the control conductor 10. The value of the magnetic permeability of this material then depends upon the value of this magnetic field and consequently upon the value of this control current. The magnetic permeability $\mu$ of this material, calculated along the axis of difficult magnetisation DA, will be considered and this permeability will be termed the transverse magnetic permeability.

Disregarding certain secondary phenomena, the operation of the devices according to the invention may be explained as indicated in the following paragraphs. The explanations given in these paragraphs are derived from the theory that has been indicated in the article of E. C. Stoner and E. P. Wohlfarth "A Mechanism of Magnetic Hysteresis in Heterogeneous Alloys" in Roy. Soc. London Philo. Trans. 240A, pp. 599–644, 1946–1948, an article to which one may refer for further information relating to thin magnetic film utilized in devices according to the present invention.

In the absence of an external magnetic field, if the intensity of the magnetic field created in the control conductor by the control current does not exceed the field of anisotropy $H_K$ (FIGURE 16) of the magnetic material, that is to say, if the strength of the control current is lower than a certain critical value, the transverse permeability has the following value:

$$\mu_m = J_S/H_K$$

$J_S$ (FIGURE 16(a)) being the value of the magnetisation at saturation.

If the control current is above the aforesaid critical value, the intensity $H_B$ of the magnetic field created in the control conductor by this current exceeds the field of anisotropy $H_K$ of the magnetic material, so that the transverse permeability of the latter takes the value $\mu_s = 1$ (FIGURE 16(b)) corresponding to the state of magnetic saturation of this material.

The ratio $\mu_m:\mu_s$ is consequently equal to the ratio $J_S:H_K$, the value of which may exceed 10,000.

It is thus possible by passing a control current of appropriate value through the control conductor 10 to vary considerably the transverse permeability of the material forming this control conductor, and accordingly to vary the self-inductance of the electric circuit connected to the winding 21.

Figure 2:
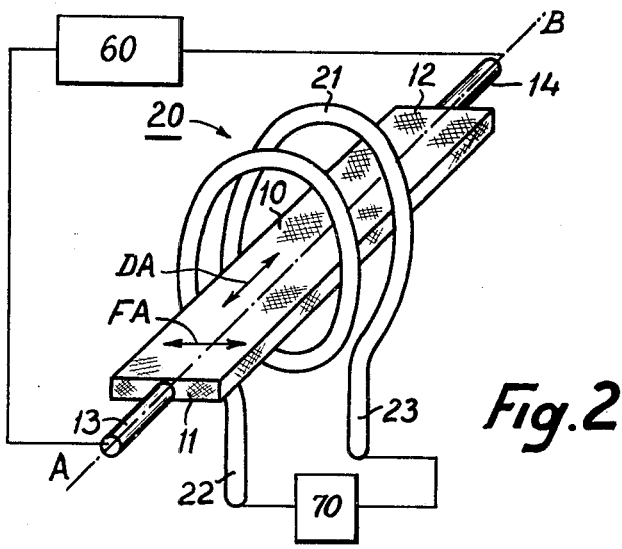
FIGURE 2 illustrates a second variable-inductance device according to the invention.

The device illustrated in FIGURE 2 comprises the same elements as the device illustrated in FIGURE 1. The axis AB of the winding is also contained in the plane of the thin film which forms the control conductor 10, and is also directed along the axis of difficult magnetisation DA, but the positions of those ends 11 and 12 of conductor 10 to which the conductors or electrodes 13 and 14 lead deduced from one another by a translation directed along the axis of difficult magnetisation DA situated in the plane of the film perpendicularly to the axis of easy magnetisation FA, so that the direction of a control current fed by the control circuit into the control conductor 10 is parallel to this axis of difficult magnetisation DA instead of being parallel to the axis of easy magnetisation FA, as in the device illustrated in FIGURE 1.

The lines of force of the magnetic field generated by this control current in the control conductor 10 extend through planes which are perpendicular to the plane of the control conductor and parallel to the axis of easy magnetisation of the material forming this control conductor. The value of the magnetic permeability of the material then depends upon this magnetic field and consequently upon the value of this control current.

As before, the transverse magnetic permeability $\mu$ of the material forming the control conductor will be considered.

In the absence of an external magnetic field, if the intensity of the magnetic field due to the control current does not exceed the field of anisotropy $H_K$ of the magnetic material, i.e. if the intensity of the control current is below a certain critical value, the transverse permeability has, as before, the value:

$$\mu_m = J_S/H_K$$

If the magnetic field due to the control current exceeds the field of anisotropy, the transverse permeability takes a value below $\mu_m$.

It can be shown that if the magnetic field $H_B$ thus created in the control conductor by the control current is very much higher than the field of anisotropy, the apparent transverse permeability takes the value:

$$\mu'_s = J_S/H_B$$

and under these condition the ratio $\mu_m:\mu'_s$ is equal to the ratio $H_B:H_K$ which, since $H_K$, the field of anisotropy, is a constant value, is proportional to $H_B$, the applied control field, which, for practical reasons cannot be raised above certain values whereby the ratio $\mu_m : \mu'_s$ is practically limited to the value 100.

With the arrangement illustrated in FIGURE 2, the variations of self-inductance of the electric circuit connected to the winding 21 are therefore smaller than those obtained with the arrangement illustrated in FIGURE 1 when the control current varies in a given ratio.

FIGURES 3 to 10 illustrate various constructional forms according to the invention of the devices illustrated in FIGURES 1 and 2.

Figure 3:
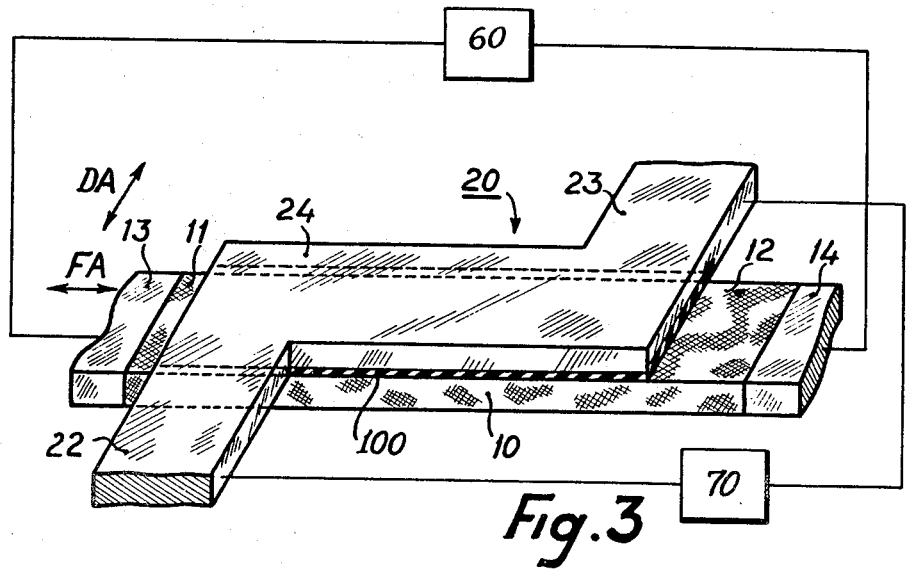
FIGURES 3, 5 and 7 illustrate, respectively, a second, a third and fourth constructional form of the device illustrated in FIGURE 1.
Figure 4:
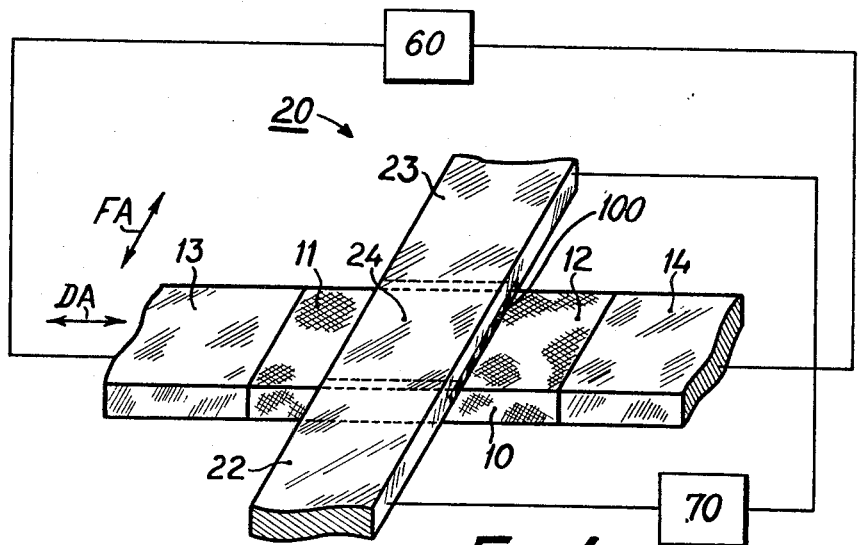
FIGURES 4 and 6 illustrate, respectively, a second and a third constructional form of the device illustrated in FIGURE 2.

The structures illustrated in FIGURES 3 and 4 correspond respectively to the devices which are illustrated in FIGURES 1 and 2. Like the latter, they comprise an electric control conductor 10 having the same magnetic characteristics as the conductor 10 of the devices illustrated in FIGURES 1 and 2, and a circuit element 20, but the latter simply consists of a rectilinear induction conductor 24 superimposed upon the control conductor 10. The induction conductor 24 is parallel to the control conductor 10 in the structure illustrated in FIGURE 3. It is perpendicular to the control conductor 10 in the construction illustrated in FIGURE 4. The induction conductor and the control conductor are appropriately insulated from one another by insulation 100, but for the sake of simplicity this has not been indicated in others of the figures.

The passage of a control current through the control conductor 10 produces in the latter a magnetic field whose lines of force are parallel, over the greater part of their length, to the axis of difficult magnetisation DA of the magnetic material (FIGURE 3), or parallel to the axis of easy magnetisation FA (FIGURE 4).

The operation of the devices illustrated in FIGURES 3 and 4 is the same as that of the devices illustrated in FIGURES 1 and 2 respectively.

Figure 5:
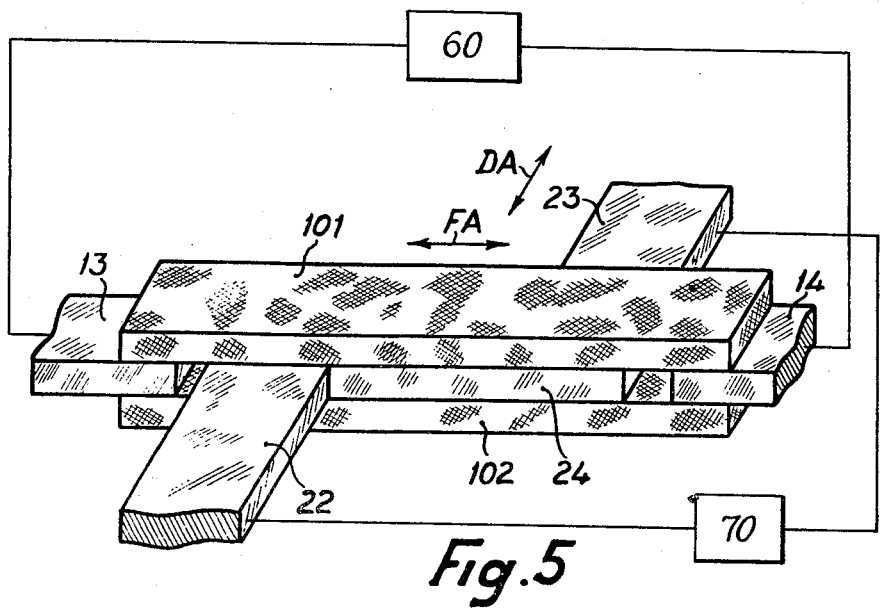
Figure 6:
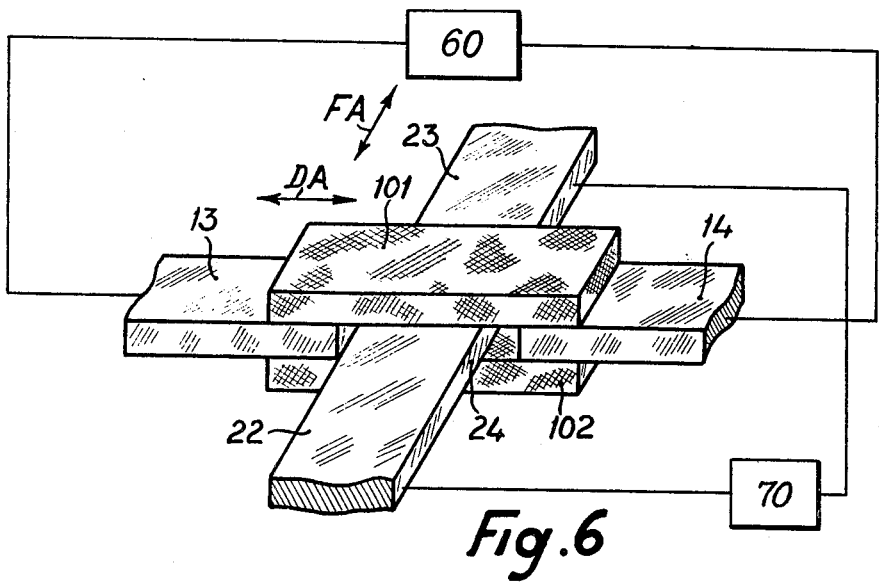

The structures illustrated in FIGURES 5 and 6 differ from those illustrated in FIGURES 3 and 4 by the fact that each control conductor 10 is replaced by two control conductors 101 and 102 having the same magnetic characteristics as the conductor 10, and disposed in parallel on either side of the induction conductor 24. Owing to this arrangement, the lines of force of the magnetic field due to a current passing through the induction conductor 24 are contained over almost all of their length in the magnetic material of the control conductors 101 and 102, so that the electromagnetic coupling between the induction conductor 24 and the magnetic material of the control conductors 101 and 102 is considerable, and given variations of the transverse magnetic permeability of the control conductors result in the greatest possible variations of the self-inductance of the signal processing circuit 70 connected to the induction conductor 24.

Figure 7:
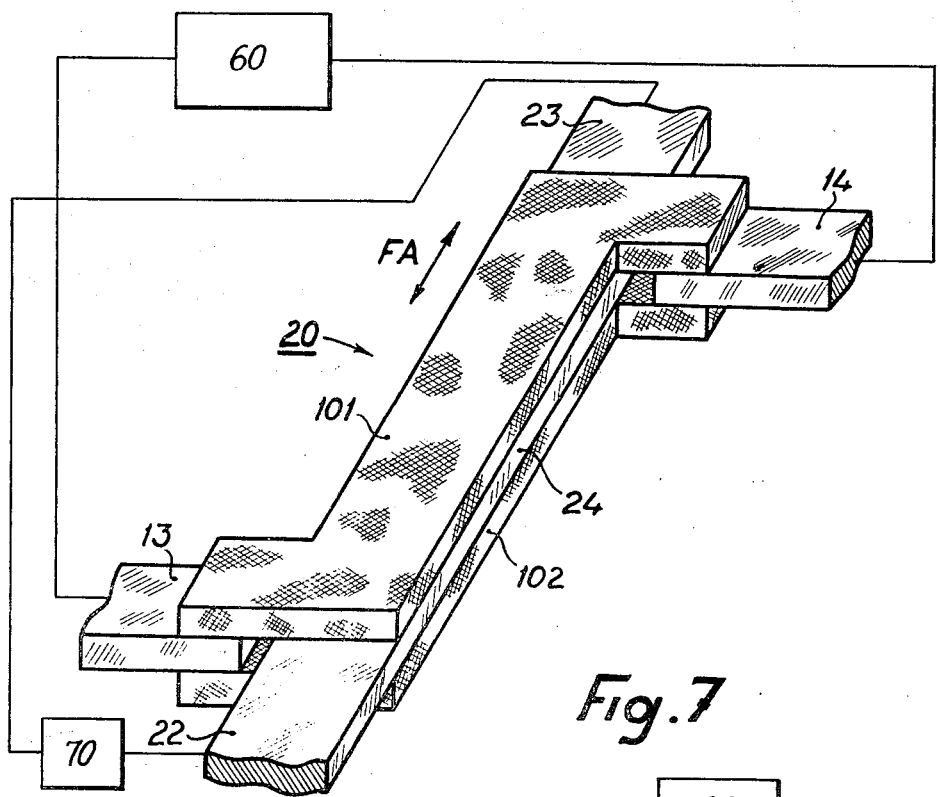

FIGURE 7 illustrates a variant of FIGURE 5, in which the control conductors 101 and 102 are of such form that they may be connected at a right-angle to the conductor portions 13 and 14, while the induction conductor 24 is rectilinear and aligned with the conductor portions 22 and 23 by which it is connected to the signal-processing circuit 70.

The arrangements indicated in FIGURES 3, 5 and 7 have the disadvantage of considerable coupling due to electromagnetic induction between the circuits 60 and 70 to which the control conductors (10, FIGURE 3; 101, 102, FIGURES 5 and 7) on the one hand and the induction conductor (24) on the other hand are respectively connected.

Figure 8:
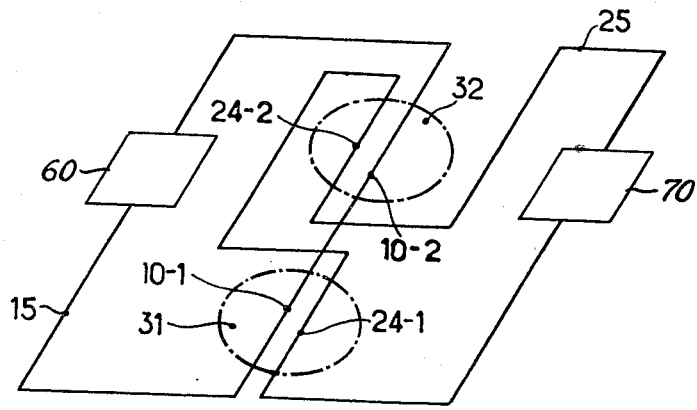
FIGURE 8 illustrates a particular circuit arrangement of two devices identical to any one of those illustrated in FIGURES 1, 3, 5 and 7.

This disadvantage may be obviated by employing, as is shown in FIGURE 8, two identical devices 31 and 32 of the type illustrated in FIGURES 1, 3, 5 and 7 and connecting the control conductors (10–1 and 10–2) on the one hand and the induction conductors (24–1 and 24–2) on the other hand so as to cancel out the mutual inductance of the circuits comprising these conductors.

Figure 9:
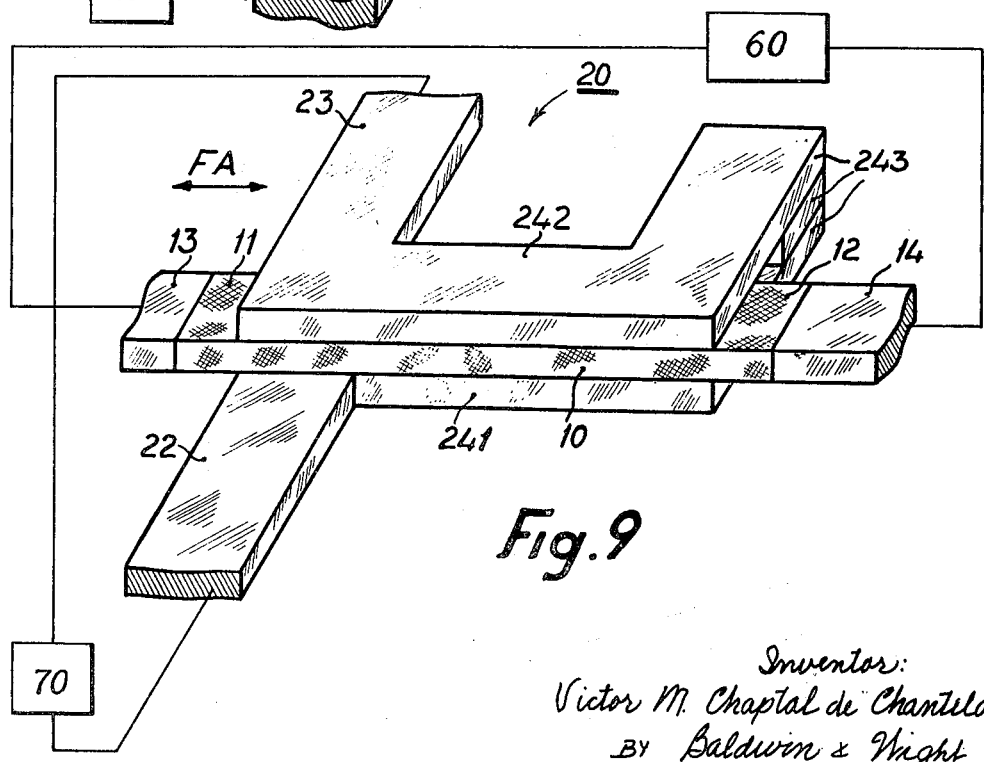
FIGURES 9 and 10 illustrate, respectively, a fifth and a sixth constructional form of the device illustrated in FIGURE 1.
Figure 10:
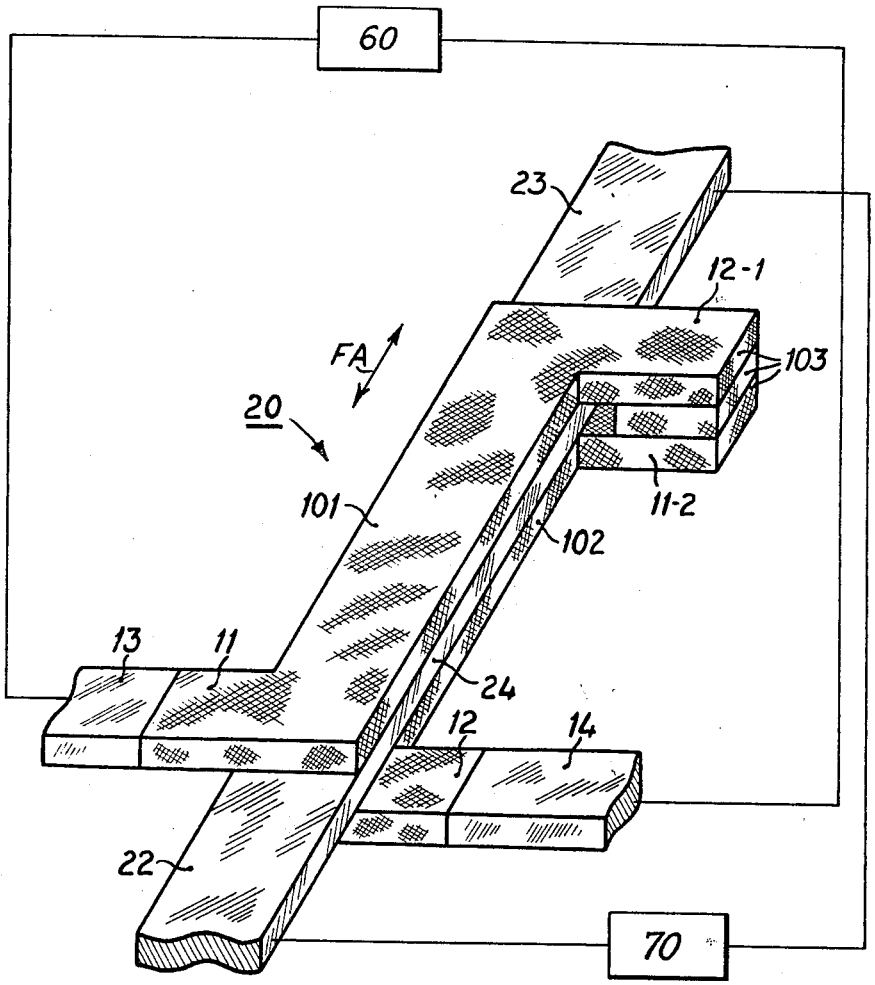

The said disadvantage may also be obviated by employing either one of the devices according to the invention as illustrated in FIGURES 9 and 10.

The device illustrated in FIGURE 9 comprises a control conductor 10 identical to that of the device illustrated in FIGURE 3. The device comprises in addition a circuit element 20 comprising two induction conductors 241 and 242 superimposed on either side of the control conductor 10, and parallel to the said conductor. These induction conductors 241 and 242 are connected in series to the signal-processing circuit 70. They are connected together at 243 at one of their ends and are connected at their other end through conductor portions 22 and 23 respectively to the said signal-processing circuit.

The device illustrated in FIGURE 10 comprises, like the device illustrated in FIGURE 7, an induction conductor 24 aligned with the conductor portions 22 and 23 by which this induction conductor is connected to the signal-processing circuits. This device comprises in addition control conductors 101 and 102 having the same magnetic characteristics as the control conductors of the device illustrated in FIGURE 7. These control conductors are connected together at 103 at one of their ends (12–1, 11–2) and are connected at their other end (11–12) by the conductors 13 and 14, respectively, to the control circuits (not shown).

Figure 11:
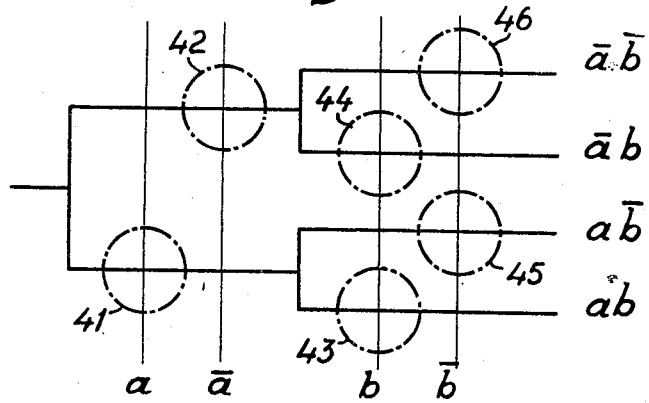
FIGURE 11 illustrates a pre-selection shaft utilising devices according to the invention.

The devices illustrated in FIGURES 1 to 10 may be employed as variable-inductance devices in all conventional applications involving variable inductances. These devices may also be employed in the manner indicated in FIGURE 11 to provide a pre-selection shaft, more especially for a storage device comprising a thin magnetic film. These variable-inductance devices are diagrammatically represented in FIGURE 11 by dash-dotted circles 41, 42 . . . 46.

By means of certain appropriate modifications, the variable-inductance devices according to the invention may be employed to form tape-form delay lines in which the delay is variable.

FIGURES 12 and 13 illustrate two particular constructional forms according to the invention of such variable-delay lines. Each comprises two external line conductors 81 and 82, two dielectric films 83 and 84, a thin film 85 of ferromagnetic material disposed between the two dielectric films and conductors 13 and 14 for connecting the thin film 85 to a control circuit (not shown).

Depending upon the strength of the control current flowing through the thin film 85, the delay produced by each of these lines takes either one of two values.

FIGURES 14 and 15 illustrate a third constructional form according to the invention of a variable-delay line. For the sake of clarity, the dielectric films have not been shown in these figures, which show, provided with the same reference numerals, the same elements as FIGURES 12 and 13. As shown in FIGURE 14, the conductor 81 follows a zig-zag path, with the longer portions parallel to the axis of easy magnetisation FA of the thin film 85 of ferromagnetic material. This arrangement provides, in the event that a long delay is desired, a more compact delay line element than the arrangement shown in FIGURES 12 and 13.

I claim:

1. A device for switching the self-inductance of an electric circuit which includes an induction coil from either one of two predetermined values to the other, which device comprises an electrically conductive thin magnetic film possessing uniaxial magnetic antisotropy, said magnetic film being located in proximity to said induction coil with its direction of easy magnetisation substantially perpendicular to the lines of force of the magnetic field produced in it by an electric current flowing through said induction coil, connecting means mounted on said magnetic film to define a path of current flow through said magnetic film, and control means connected to said connecting means for establishing a control current flow in the magnetic film creating a control magnetic field of sufficient magnitude to drive said magnetic film into the state of saturation, whereby the permeability of said magnetic film with respect to the direction perpendicular to that of easy magnetisation, and thereby the self-inductance of the electric circuit which includes said induction coil, takes either one or the other of two predetermined values as said control means accordingly is operating or not operating to establish said control current flow.

2. A device comprising an electric circuit which includes a planar strip induction conductor and of which the self-inductance is to be switched from either one of two predetermined values to the other, said device further comprising an electrically conductive thin magnetic film possessing uniaxial magnetic anisotropy, said magnetic film being located in close proximity to the strip induction conductor in a plane parallel to the plane of said strip induction conductor, and with its direction of easy magnetisation parallel to said strip induction conductor and substantially perpendicular to the lines of force of the magnetic field produced in it by an eleccric current flowing in said strip induction conductor, said strip induction conductor and said magnetic film being insulated from one another, connecting means connected to said magnetic film to define a path of current flow through said magnetic film, and control means connected to said connecting means for establishing a control current flow in the magnetic film creating a control magnetic field of sufficient magnitude to drive said magnetic film into the state of saturation, whereby the permeability of said magnetic film with respect to the direction perpendicular to that of easy magnetisation, and thereby the self-inductance of the electric circuit including said strip induction conductor, takes either one or the other of two predetermined values as said control means accordingly is operating or not operating to establish said control current flow.

3. A device comprising an electric circuit of which the self-inductance is to be switched from either one of two predetermined values to the other and which includes a planar strip conductor, said device further comprising two identical electrically conductive thin magnetic films possessing uniaxial anisotropy, said magnetic films being superposed on either face of said conductor with their direction of easy magnetisation parallel to said conductor, connecting means defining a path of current flow through each of said magnetic films and connecting the thus defined paths in parallel, and control means including a source of control current connected to said connecting means for establishing through each of said defined paths a control current flow of such a first or second value as to induce in the respective magnetic film a control magnetic field of either a first or a second intensity respectively, said first and second values of the control current flow being taken in the ranges of values to which correspond respectively the unsaturated and the saturated condition of said magnetic films, whereby the permeability of each of these magnetic films with respect to the direction perpendicular to that of easy magnetisation, and thereby the self-inductance of the electric circuit, takes either one or the other of two predetermined values as said control means accordingly is operated to establish said control current flow of said first or said second value.

4. A device comprising an electric circuit of which the self-inductance is to be switched from either one of two predetermined values to the other and which includes a planar strip conductor, said device further comprising two identical electrically conductive thin magnetic films possessing uniaxial anisotropy, said magnetic films being superposed on either face of said conductor with their direction of easy magnetisation parallel to said conductor, connecting means defining a path of current flow through each of said magnetic films in the direction of easy magnetisation and connecting the thus defined paths in series, and control means including a source of control current connected to said connecting means for establishing through each of said defined paths a control current flow of such a first or a second value as to induce in the respective magnetic film a control magnetic field of either a first or a second intensity respectively, said first and second values of the control current flow being taken in the range of values to which correspond respectively the unsaturated and the saturated condition of said magnetic films, whereby the permeability of each of these magnetic films with respect to the direction perpendicular to that of easy magnetisation, and thereby the self-inductance of said electric circuit, either one or the other of two predetermined values as said control means accordingly is operated to establish said control current flow of said first or said second value.

5. A device comprising an electric circuit of which the self-inductance is to be switched from either one of two predetermined values to the other and which includes two identical planar strip conductors lying in superpose positions and connected in series, said device further comprising an electrically conductive thin magnetic film possessing uniaxial magnetic anisotropy, said magnetic film being located in a position intermediate between these conductors in a plane parallel to the planes of these conductors and with its direction of easy magnetisation parallel to said conductors, connecting means defining a path of current flow through said magnetic film in the direction of easy magnetisation, and control means connected to said connecting means for establishing through said defined path a control current flow which induces in the magnetic film a control magnetic field of sufficient magnitude to drive said magnetic film into the state of saturation, whereby the permeability of said magnetic film with respect to the direction perpendicular to that of easy magnetisation, and thereby the self-inductance of the electric circuit, takes either one or the other of two predetermined values as said control means accordingly is operating or not operating to establish said control current flow.

6. A device comprising an electromagnetic transmission line in which signal propagation delay takes either one or the other of two predetermined values and which includes two superposed strip conductors, said device further comprising an electrically conductive thin magnetic film possessing uniaxial magnetic anisotropy, said magnetic film being located in a position intermediate between said conductors in a plane parallel to the planes of said conductors and with its direction of easy magnetisation parallel to the direction of propagation of signals in at least a part of said line, connecting means defining a path of current flow through said magnetic film, and control means connected to said connecting means for establishing through said defined path a control current flow which induces in the magnetic film a control magnetic field of sufficient magnitude to drive said magnetic film into the state of saturation, whereby the permeability of said magnetic film with respect to the direction perpendicular to that of easy magnetisation, and thereby the signal propagation delay of the transmission line, takes either one or the other of two values as said control means accordingly is operating or not operating to establish said control current flow.

References Cited

UNITED STATES PATENTS

| | | | |
|---|---|---|---|
| 3,399,361 | 8/1968 | Belson | 333—84 |
| 3,243,734 | 3/1966 | Bartik | 333—20 |
| 3,366,939 | 1/1968 | De Chanteloup | 340—174 |
| 3,264,621 | 8/1966 | Gray | 340—174 |
| 3,344,366 | 9/1967 | Ngo | 333—31 |
| 2,907,957 | 10/1959 | Dewitz | 333—29 |
| 3,292,161 | 12/1966 | Broadbent | 340—174 |

(Other references on following page)

UNITED STATES PATENTS

| | | | |
|---|---|---|---|
| 3,257,629 | 6/1966 | Kornreich | 333—31 |
| 3,141,145 | 7/1964 | Barrett | 333—79 |
| 3,145,372 | 8/1964 | Suits et al. | 340—174 |
| 3,092,812 | 6/1963 | Rossing et al. | 340—174 |

OTHER REFERENCES

I.B.M. Tech. Disclosure Bulletin, vol. 3, #6, p. 53, November 1960, 340–174 (TF).

R. Kornreich: Journal of Applied Physics, vol. 34, April 1963, pp. 1169–70.

HERMAN KARL SAALBACH, Primary Examiner

C. BARAFF, Assistant Examiner

U.S. Cl. X.R.

323—89; 333—30, 81; 336—155; 340—174